United States Patent
Taniguchi

[19]

[11] Patent Number: 6,011,343
[45] Date of Patent: Jan. 4, 2000

[54] ROTOR OF ROTARY MACHINE HAVING CLAW POLES AND AUXILIARY PERMANENT MAGNETS

[75] Inventor: Makoto Taniguchi, Kariya, Japan

[73] Assignee: Denso Corporation, Kariya, Japan

[21] Appl. No.: 09/037,498

[22] Filed: Mar. 10, 1998

[30] Foreign Application Priority Data

Mar. 21, 1997 [JP] Japan .................................... 9-068019

[51] Int. Cl.$^7$ ................................ H02K 1/22; H02K 9/00
[52] U.S. Cl. .......................... 310/263; 310/42; 310/60 A; 310/61; 310/62
[58] Field of Search ............................... 310/263, 61, 58, 310/60 R, 63, 60 A, 52, 269, 156, 181, 192, 159, 162, 42, 43; 29/596, 598

[56] References Cited

U.S. PATENT DOCUMENTS

| | | | |
|---|---|---|---|
| 3,271,606 | 9/1966 | Collins | 310/269 |
| 5,306,977 | 4/1994 | Hayashi | 310/263 |
| 5,483,116 | 1/1996 | Kusase et al. | 310/263 |
| 5,578,885 | 11/1996 | Alford et al. | 310/263 |
| 5,705,865 | 1/1998 | Ishida et al. | 310/62 |
| 5,828,155 | 10/1998 | Adachi et al. | 310/263 |

FOREIGN PATENT DOCUMENTS

| | | |
|---|---|---|
| 4-049836 | 2/1992 | Japan . |
| 6-284638 | 10/1994 | Japan . |
| 7-298585 | 11/1995 | Japan . |
| 1 036 986 | 7/1966 | United Kingdom . |

*Primary Examiner*—Nestor Ramirez
*Assistant Examiner*—Tran N Nguyen
*Attorney, Agent, or Firm*—Pillsbury Madison & Sutro LLP

[57] ABSTRACT

In a rotor of a rotary machine having a plurality of claw poles extending in the axial direction of the rotor alternately from opposite ends and a plurality of auxiliary permanent magnets held between adjacent two of said claw poles, each of the claw poles has trapezoidal outer and inner peripheries with the sides thereof forming parallelopiped rectangular spaces between adjacent claw poles. The permanent magnet members are fitted to the spaces so that the side walls of the magnet members extend to the inside of the claw poles to function as an axial flow fan.

19 Claims, 4 Drawing Sheets

FIG. 5
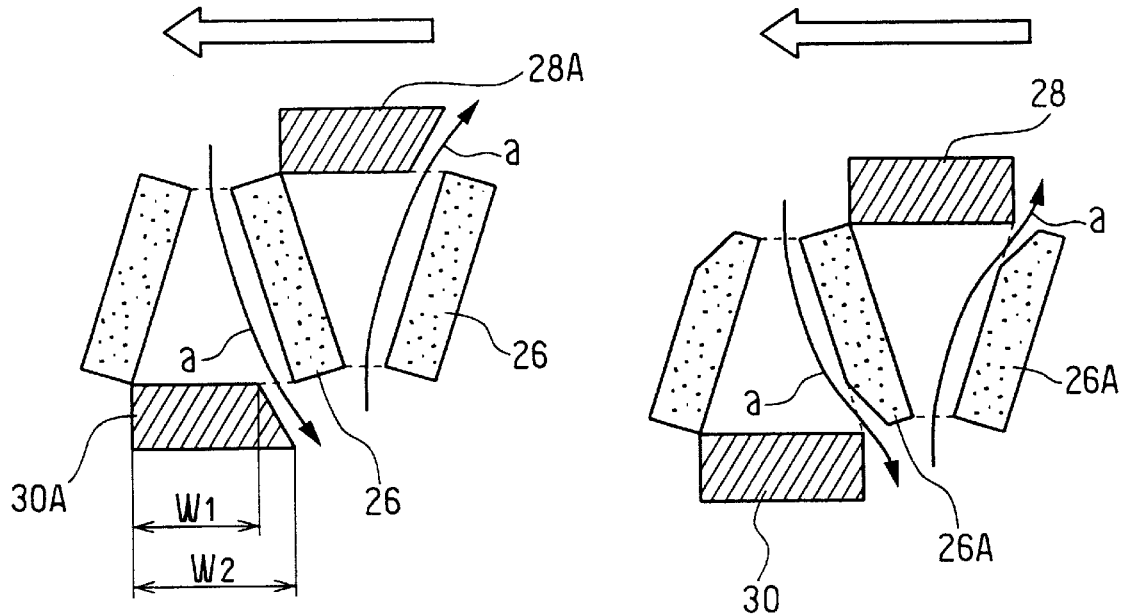
FIG. 6
FIG. 7
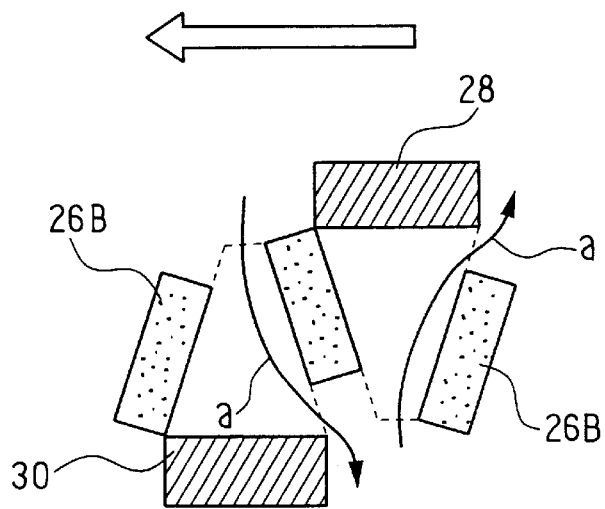

6,011,343

ROTOR OF ROTARY MACHINE HAVING CLAW POLES AND AUXILIARY PERMANENT MAGNETS

CROSS REFERENCE TO RELATED APPLICATION

The present application is based on and claims priority from Japanese Patent Application No. Hei 9-68019, filed on Mar. 21, 1997, the contents of which are incorporated herein by reference.

BACKGROUND OF THE INVENTION

1. Field of the Invention

The present invention relates to a rotor of a rotary machine having claw poles and auxiliary permanent magnets for increasing effective magnetic flux.

2. Description of the Related Art

A rotor of a vehicular alternator has a plurality of claw poles extending in the axial direction alternately from opposite sides of the rotor. Recently, increase in the output power of the alternator is demanded with increase in the electric load of vehicles. In order to meet the demand, auxiliary permanent magnets are disposed between the claw poles to reduce leakage magnetic flux of the rotor.

For example, a rotor of a rotary machine disclosed in U.S. Pat. No. 5,483,116 (which corresponds to JP-A-7-123664) has a crown-shaped resinous holder in which sixteen permanent magnets are held. The holder surrounds the claw poles zigzag and is retained by flange members disposed between the claw poles or by wedge-like cross section of the permanent magnets in engagement with the claw poles. JP-A-7-298585 discloses a rotor of a vehicular alternator which has spaces between the claw poles to accommodate permanent magnets and cooling air passages between the claw poles and the field coil. Thus, permanent magnets, which can not exhibit magnetic performance sufficient to suppress the leakage magnetic flux under high temperature, are cooled. However, this structure can not introduce sufficient cooling air to cool the permanent magnets.

U.S. Pat. No. 5,306,977 (which corresponds to JP-A-5-207716) discloses a structure of the rotor for cooling the permanent magnets. The structure is composed of a nonmagnetic ring for holding the permanent magnets. Cooling air passages are formed between the ring and the permanent magnets to introduce cooling air in the radially outer direction. However, in order to cool the permanent magnets sufficiently, the size of the cooling air passage has to be increased. This increases the magnetic reluctance of the magnetic circuit and, in turn, decreases the size of the permanent magnets, resulting in decrease in the output power.

SUMMARY OF THE INVENTION

Therefore, an object of the present invention is to provide an improved rotor of a rotary machine which can cool the permanent magnets sufficiently without decrease in the output power of the rotary machine.

According to an aspect of the present invention, auxiliary permanent magnets or permanent magnets with their holders (hereinafter referred to as permanent magnet members) are disposed between the claw poles so that the side walls of the permanent magnet members extend from the inner peripheral surface of the claw poles over the length of the permanent magnet members. Thus, the side walls of the permanent magnet members form blades of an axial flow fan that generates cooling air effectively when the rotor rotates.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 5 is a schematic diagram of air flow generated along the side walls of permanent magnets disposed in the rotor according to the second embodiment;

FIG. 6 is a schematic diagram of air flow generated along the side walls of the permanent magnets disposed in the rotor according to a third embodiment of the present invention;

FIG. 7 is a schematic diagram of air flow air flow generated along the side walls of the permanent magnets disposed in the rotor according to a fourth embodiment of the present invention;

DETAILED DESCRIPTION OF THE PREFERRED EMBODIMENTS

Figure 1:
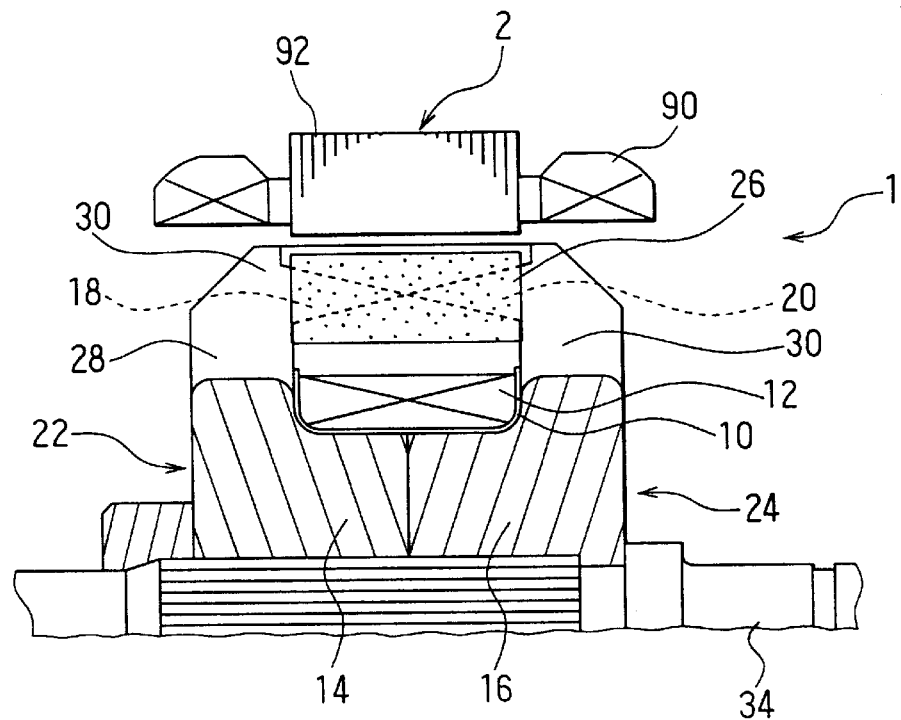
FIG. 1 is a fragmental cross-sectional view of a main portion of an alternator according to a first embodiment of the present invention.

An alternator according to a first embodiment of the present invention is described with reference to FIGS. 1–3. Rotor 1 has insulating bobbin 10, cylindrical field coil 12 of copper wire wound around bobbin 10.

Stator 2 is disposed around rotor 1 and has three-phase stator coil 90 wound on stator core 92.

Rotor 1 has a pair of pole cores 22, 24, which has boss portions 14, 16, claw poles 18, 20 and base portions 28, 30. Base portion 28, 30 connects boss portions 14, 16 and claw poles 18, 20. Shaft 34 is press-fitted into the center hole of boss portions 14, 16. Claw poles 18, 20 extend from the circumference of base portions 28, 30 in the axial direction of the rotor. Each of pole cores 22, 24 has six claw poles 18, 20. Each of claw poles 18, 20 has a tapering trapezoidal outer and inner surfaces so that each of claw poles 18 and 20 is alternately disposed in the direction of rotation to provide rectangular parallelopiped space therebetween. Each of twelve auxiliary permanent magnets 26 is fitted in one of the rectangular parallelopiped spaces, which form magnetic-flux-leakage paths.

Permanent magnets 26 can be made of ferrite magnets, resin magnets or rare-earth metal magnets. Each of permanent magnet 26 is disposed near base portion 28 or 30 in the space so that the side walls thereof extend radially inside from the inner peripheries of claw poles 18 over the length of permanent magnet 26. Thus, each of the extending walls of permanent magnets 26 extending from the inner peripheries of claw poles 18 can function as a fan blade of a two-way axial flow fan and a cooling fin.

Figure 2:
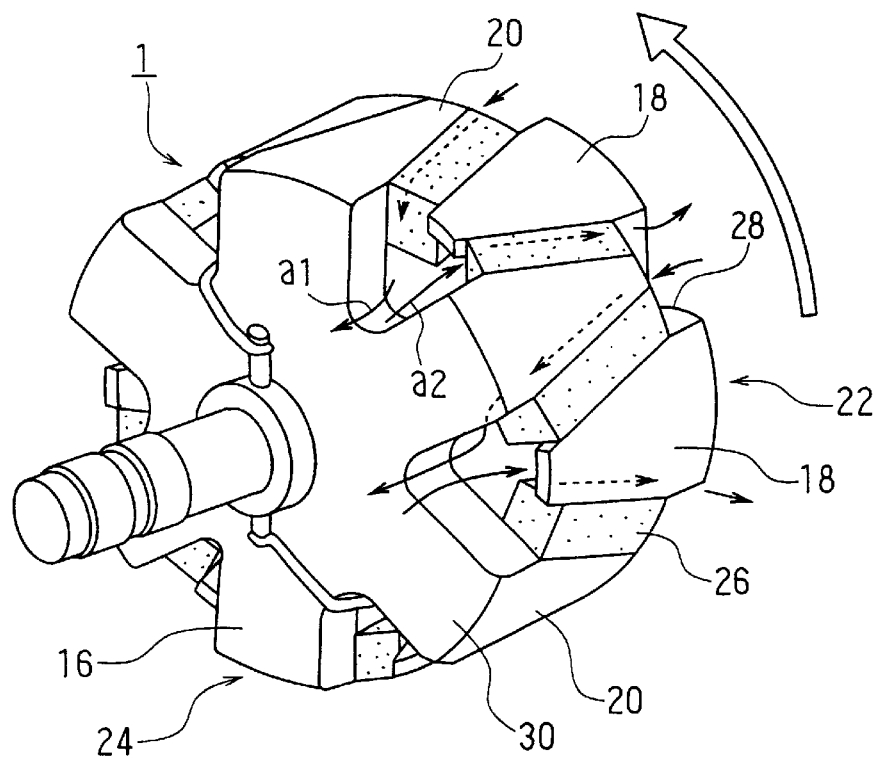
FIG. 2 is a perspective view of the rotor illustrated in FIG. 1.

As illustrated in FIG. 2, an opening for cooling air flow is formed between the inner periphery of claw poles 18 of pole core 22 and a side of base portion 30 of pole core 24 opposite the inner periphery of claw pole 18. The other opening of the same cooling air passages is formed between the inner periphery of adjacent claw poles 20 of the other pole core 24 and a side of base portions 28 of pole core 22 opposite the inner periphery of claw pole 20.

When rotor 1 rotates, the extending walls of permanent magnets 26 compress the air in front of the extending side walls and generate cooling air flows flowing along the side walls of permanent magnets 26 because permanent magnets 26 are disposed to conform to the shape of claw poles 18, 20 to have the side walls inclined with respect to the rotating axis. As indicated by arrows a1, a2 shown in FIGS. 2 and 3, two-way streams of the cooling air are formed each of the openings along the front-side of the extending side walls of permanent magnets 26 in the rotation. When the cooling air discharges from the opening, the pressure inside the claw poles lowers so that fresh air is introduced from outside through the openings.

Thus, when rotor 1 rotates, the extending side walls of permanent magnets 26 function like an axial flow fan. Accordingly, the cooling air cools permanent magnets 26 effectively and the temperature of permanent magnets 26 is kept low. As a result, permanent magnets 26 are not demagnetized, and the alternator output power can be maintained without decrease.

Figure 4:
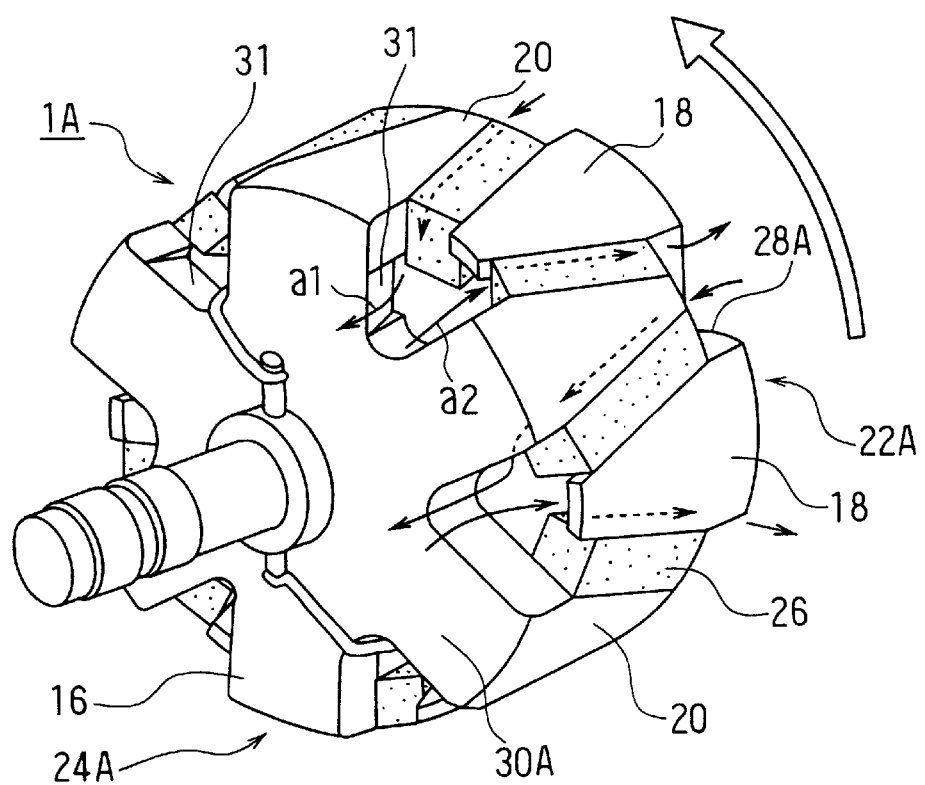
FIG. 4 is a perspective view of a rotor according to a second embodiment of the present invention.

A rotor according to a second embodiment is described with reference to FIGS. 4 and 5.

Rotor 1A has a pair of pole cores 22A and 24A which have a plurality of base portions 28A and 30A respectively. The width of branches 31 of base portions 28A, 30A contiguous to claw poles is reduced to widen the opening for the air flow. Thus, the resistance of the cooling-air-flow is reduced so that cooling air can be increased. As shown in FIG. 5, width WI of branch 31 near permanent magnet 26 is narrower than width W2 thereof remote from permanent magnet 26. Accordingly, the cooling air can flow along the side wall of permanent magnets 26 with less obstruction of base portions 28A, 30A.

Instead of base portion 28A having branches 31 of reduced width W1 as described above, a base portion having round corner or chamfered corner can be adopted.

A rotor according to a third embodiment of the present invention is described with reference to FIG. 6.

Permanent magnets 26A has a chamfered end of reduced width at the openings of the air flow passages.

A rotor according to a third embodiment of the present invention is described with reference to FIG. 7. Rectangular parallelopiped permanent magnets are more preferable to the permanent magnets 26A shown in FIG. 6 in view of production cost. Permanent magnet 26B shown in FIG. 7 have a length to provide wide openings of the cooling air passages. The permanent magnets 26B in the downstream portion of the air flow passages are shifted to the tips of the claw poles and permanent magnets 26B in the upstream portion of the air flow passages are shifted to the base portions of the same claw poles. Thus, the length of permanent magnets 26B is made shorter than the length of the side surface of claw poles 18, 20 in contact with permanent magnets 26B.

Figure 8:
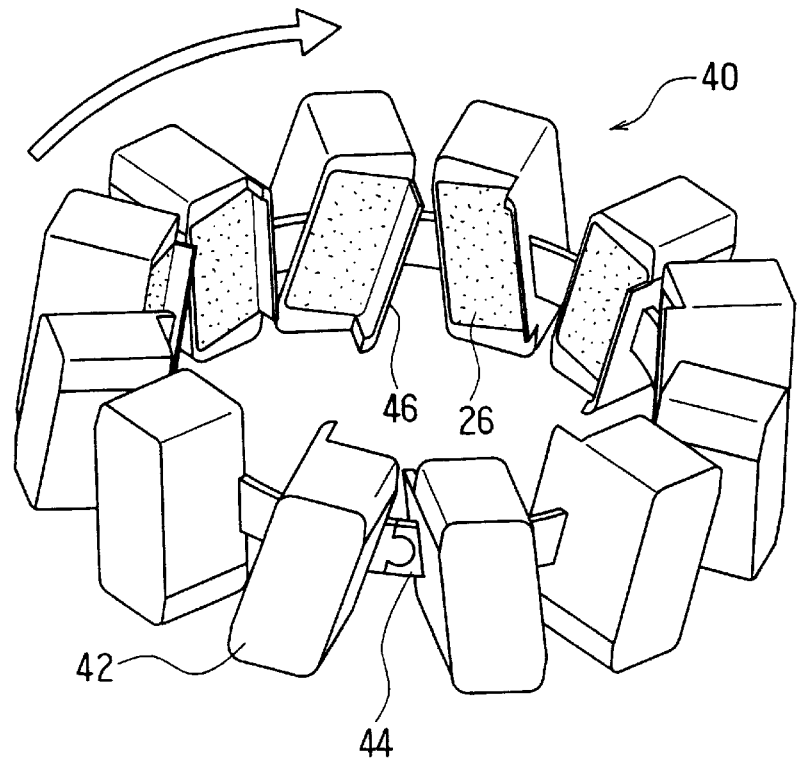
FIG. 8 is a perspective view illustrating a permanent-magnet holder of a rotor according to a fifth embodiment.

A rotor according to a fifth embodiment of the present invention is described with reference to FIG. 8.

Magnet holder 40 has twelve cup-shaped receptacles 42 for holding permanent magnets 26 therein and couplers 44 coupling adjacent receptacles 42 into a ring. Each of receptacle 42 has an inside opening from which one of permanent magnets 26 is inserted.

Each of receptacles 42 has a fin-like extending side wall 46 on the front side of the rotation. Extending side walls 46 function as blades of a two-way axial flow fan.

Figure 3:
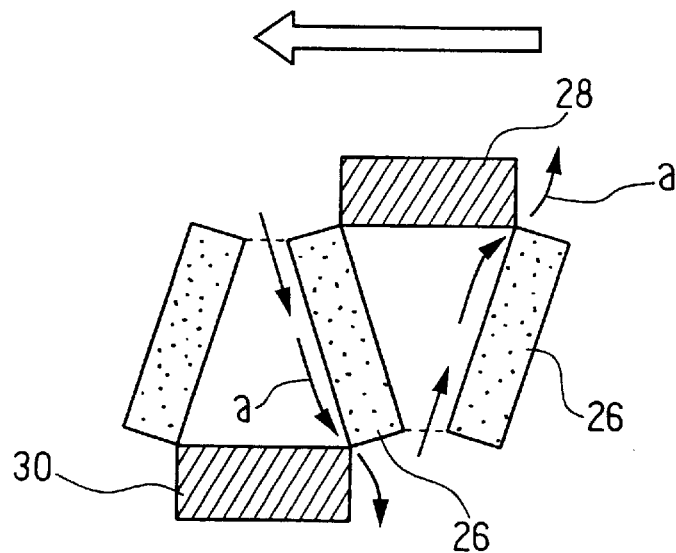
FIG. 3 is a schematic diagram of air flow passages formed in the rotor according to the first embodiment.

Therefore, cooling air flows are generated as shown in FIG. 3. If extending side walls 46 are made of non-magnetic material having good heat conductivity such as stainless steel, the extending portions function as cooling fins so that permanent magnets can be cooled more effectively. Therefore, it is not necessary to provide permanent magnets 26 with the extending side walls.

The extending side walls can be made of magnetic material if the extending side walls are thin enough to insulate the magnetic influence. The extending side walls can have dimples or louvers on the edges or the surfaces thereof to provide more effective heat radiation.

Figure 9:
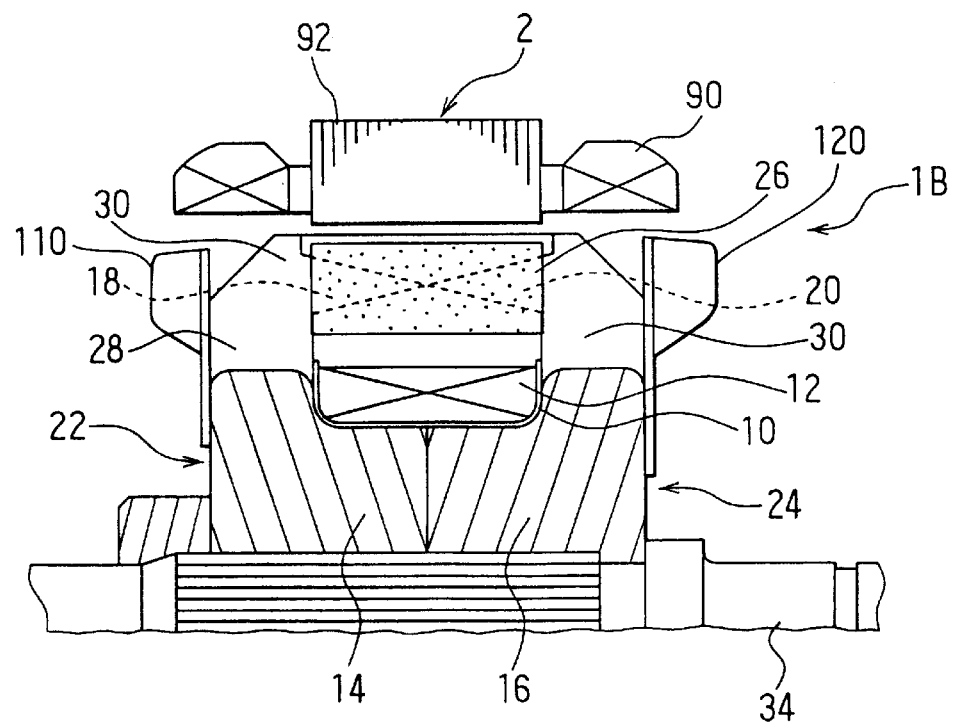
FIG. 9 is a fragmental cross-sectional view illustrating a variant of the rotor shown in FIG. 1.

A variation of the rotor is described with reference to FIG. 9. Rotor 1B has a pair of cooling fans 110, 120 fixed to the opposite ends thereof. Cooling fans 110, 120 mainly cool stator coil 90. However, a centrifugal-axial-mixed flow fan can be adopted to one of cooling fans 110, 120 to increase the cooling air passing through the inside of the rotor along the extending side walls of permanent magnets 26. In this case, the mixed-flow fan generates the air flow flowing in the same direction as the air flow generated by the extending side walls of permanent magnets. For this purpose, a half of the extending side walls of the above embodiments which generate the air flow in the opposite direction must be omitted.

In the above embodiments, a brushless type alternator can be substituted for the alternator. The present invention is also applicable to a non-vehicle generator or a motor which has claw poles.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotor of a rotary machine comprising:
   a shaft;
   a pair of core members disposed on opposite ends of said rotor, each of said core members having a boss portion fitted to said shaft and a base portion;
   a plurality of claw poles alternately extending from said base portion of said pair of core members in the axial direction of said rotor, each of said claw poles having tapering trapezoidal outer and inner peripheries and a pair of side surfaces inclined with respect to said axial direction of said of said rotor to form a rectangular parallelepiped space between one of said side surface of one of said claw poles and an opposite one of said side surface of an adjacent one of said claw poles;
   a cylindrical field coil disposed inside said inner peripheries of said claw poles;
   a plurality of permanent magnet members each of which is fitted to said rectangular parallelepiped space, at least a portion of said permanent magnet members having a side wall extending from said inner periphery of said claw poles into spaces formed between said inner peripheries of said claw poles and the outer periphery of said field coil over the length of said permanent magnet members to form a one-way axial flow fan having two openings, one of said openings being formed between one end of one of said permanent magnet members and said base portion of one of said core members and the other of said openings being formed between the other end of said one of permanent magnet members and said base portion of the other of said core members; and a mixed-flow cooling fan fixed to an axial end of said pair of core members, wherein each of said permanent magnet members comprises a permanent magnet and a receptacle having a fin-like member.

2. A rotor of a rotary machine comprising:

a shaft;

a pair of core members disposed on opposite ends of said rotor, each of said core members having a boss portion fitted to said shaft and a base portion;

a plurality of claw poles alternately extending from said base portion of said pair of core members in the axial direction of said rotor, each of said claw poles having tapering trapezoidal outer and inner peripheries and a pair of side surfaces inclined with respect to said axial direction of said of said rotor to form a rectangular parallelepiped space between one of said side surface of one of said claw poles and an opposite one of said side surface of an adjacent one of said claw poles;

a cylindrical field coil disposed inside said inner peripheries of said claw poles;

a plurality of permanent magnet members each of which is fitted to said rectangular parallelepiped space, at least a portion of said permanent magnet members having a side wall extending from said inner periphery of said claw poles into spaces formed between said inner peripheries of said claw poles and the outer periphery of said field coil over the length of said permanent magnet members to form a one-way axial flow fan having two openings, one of said openings being formed between one end of one of said permanent magnet members and said base portion of one of said core members and the other of said openings being formed between the other end of said one of permanent magnet members and said base portion of the other of said core members; and a mixed-flow cooling fan fixed to an axial end of said pair of core members, wherein at least one of said base portions has a conduit at a portion thereof forming one of said openings thereby decreasing air flow resistance of said axial flow fan.

3. The rotor as claimed in claim 2, wherein each of said permanent magnet members comprises a permanent magnet and a receptacle having a fin-like member.

4. A rotor of a rotary machine comprising:

a shaft;

a pair of core members disposed on opposite ends of said rotor, each of said core members having a boss portion fitted to said shaft and a base portion;

a plurality of claw poles alternately extending from said base portion of said pair of core members in the axial direction of said rotor, each of said claw poles having tapering trapezoidal outer and inner peripheries and a pair of side surfaces inclined with respect to said axial direction of said of said rotor to form a rectangular parallelepiped space between one of said side surface of one of said claw poles and an opposite one of said side surface of an adjacent one of said claw poles;

a cylindrical field coil disposed inside said inner peripheries of said claw poles;

a plurality of permanent magnet members each of which is fitted to said rectangular parallelepiped space, at least a portion of said permanent magnet members having a side wall extending from said inner periphery of said claw poles into spaces formed between said inner peripheries of said claw poles and the outer periphery of said field coil over the length of said permanent magnet members to form a one-way axial flow fan having two openings, one of said openings being formed between one end of one of said permanent magnet members and said base portion of one of said core members and the other of said openings being formed between the other end of said one of permanent magnet members and said base portion of the other of said core members, and a mixed-flow cooling fan fixed to an axial end of said pair of core members, wherein at least one of said permanent magnet members has a chamfered portion at a portion thereof forming one of said openings thereby decreasing air flow resistance of said axial flow fan.

5. The rotor as claimed in claim 4, wherein each of said permanent magnet members comprises a permanent magnet and a receptacle having a fin-like member.

6. A rotor of a rotary machine having a plurality of claw poles extending in the axial direction of said rotor alternately from opposite ends of said rotor and a plurality of permanent magnet members held between adjacent two of said claw poles, wherein each of said claw poles has tapering trapezoidal outer and inner peripheries and a pair of side surfaces inclined with respect to said axial direction of said rotor to form a rectangular parallelepiped space between one of said side surface of one of said claw poles and an opposite one of said side surface of an adjacent one of said claw poles, and each of said permanent magnet members is fitted to one of said rectangular parallelepiped space, wherein at least a portion of said permanent magnet members has a side wall extending from said inner periphery of said claw poles over the length of said permanent members to form an axial flow fan, and further comprising a shaft, a pair of core members each of which has a boss portion fitted to said shaft and a base portion from which said claw poles extend to the other, wherein one opening of said axial flow fan is formed between one end of one said permanent magnet members and said base portion of one of said core members and the other opening of said axial flow fan is formed between the other end of said one of permanent magnet members and said base portion of the other of said core members, and wherein each portion of said base portions that forms said opening has a conduit to decrease air flow resistance of said axial flow fan.

7. The rotor as claimed in claim 6 and further comprising a cooling fan fixed to an end thereof.

8. The rotor as claimed in claim 7, wherein said cooling fan is a centrifugal fan.

9. The rotor as claimed in claim 8, wherein said axial flow fan formed by said side walls of said permanent magnet members is a one-way axial flow fan, and said cooling fan is a mixed-flow for generating cooling air flow in the same direction as said axial flow fan.

10. The rotor as claimed in claim 6, wherein each of said permanent magnet members comprises a permanent magnet and a receptacle having a fin-like member.

11. A rotor of a rotary machine having a plurality of claw poles extending in the axial direction of said rotor alternately from opposite ends of said rotor and a plurality of permanent magnet members held between adjacent two of said claw poles, wherein each of said claw poles has tapering trapezoidal outer and inner peripheries and a pair of side surfaces inclined with respect to said axial direction of said rotor to form a rectangular parallelepiped space between one of said side surface of one of said claw poles and an opposite one of said side surface of an adjacent one of said claw poles, and each of said permanent magnet members is fitted to one of said rectangular parallelepiped space, and wherein at least a portion of said permanent magnet members has a side wall extending from said inner periphery of said claw poles over the length of said permanent members to form an axial flow fan, and further comprising a shaft, a pair of core members each of which has a boss portion fitted to said shaft and a base portion from which said claw poles extend to the other, wherein one opening of said axial flow fan is formed between one end of one said permanent magnet members and said base portion of one of said core members and the other opening of said axial flow fan is formed between the other end of said one of permanent magnet members and said base portion of the other of said core members, and wherein each portion of said permanent magnet members that forms said opening has an additional opening to decrease resistance of said air flow passage.

12. The rotor as claimed in claim 11, wherein each of said permanent magnet members has a chamfered portion to form said additional opening.

13. The rotor as claimed in claim 12, wherein said axial flow fan formed by said side walls of said permanent magnet members is a one-way axial flow fan, and said cooling fan is a mixed-flow for generating cooling air flow in the same direction as said axial flow fan.

14. The rotor as claimed in claim 12 and further comprising a cooling fan fixed to an end thereof.

15. The rotor as claimed in claim 12, wherein said cooling fan is a centrifugal fan.

16. The rotor as claimed in claim 11 and further comprising a cooling fan fixed to an end thereof.

17. The rotor as claimed in claim 16, wherein said cooling fan is a centrifugal fan.

18. The rotor as claimed in claim 17, wherein said axial flow fan formed by said side walls of said permanent magnet members is a one-way axial flow fan, and said cooling fan is a mixed-flow for generating cooling air flow in the same direction as said axial flow fan.

19. The rotor as claimed in claim 11, wherein each of said permanent magnet members comprises a permanent magnet and a receptacle having a fin-like member.

* * * * *

UNITED STATES PATENT AND TRADEMARK OFFICE
CERTIFICATE OF CORRECTION

PATENT NO.    : 6,011,343                                         Page 1 of 1
DATED         : January 4, 2000
INVENTOR(S)   : Taniguchi It is certified that error appears in the above-identified patent and that said Letters Patent is hereby corrected as shown below:

<u>Title page,</u>
Please insert under Foreign Patent Documents -- 762 617 A1  03/1997  Europe --.

Signed and Sealed this

Twenty-sixth Day of February, 2002

Attest:

Attesting Officer

JAMES E. ROGAN
Director of the United States Patent and Trademark Office